United States Patent
Koroglu et al.

(10) Patent No.: US 8,126,420 B2
(45) Date of Patent: Feb. 28, 2012

(54) CORRECTING FOR PHASE NOISE OF AN OSCILLATOR

(75) Inventors: Mustafa H. Koroglu, Austin, TX (US); G. Tyson Tuttle, Austin, TX (US); Peter J. Vancorenland, Austin, TX (US); Alessandro Piovaccari, Austin, TX (US)

(73) Assignee: Silicon Laboratories Inc., Austin, TX (US)

( * ) Notice: Subject to any disclaimer, the term of this patent is extended or adjusted under 35 U.S.C. 154(b) by 1072 days.

(21) Appl. No.: 12/005,513

(22) Filed: Dec. 27, 2007

(65) Prior Publication Data

US 2009/0170463 A1 Jul. 2, 2009

(51) Int. Cl.
*H04B 1/10* (2006.01)

(52) U.S. Cl. .......... 455/311; 455/318; 375/376

(58) Field of Classification Search .......... 455/130, 455/255, 256, 259, 260, 295, 296, 307, 310, 455/311, 317, 318; 375/375, 376, 346
See application file for complete search history.

(56) References Cited

U.S. PATENT DOCUMENTS

| 6,091,303 A * | 7/2000 | Dent .............................. 455/260 |
| 2006/0056561 A1* | 3/2006 | Zhang ........................... 375/376 |
| 2007/0218854 A1* | 9/2007 | Lawrence et al. ............. 455/310 |

OTHER PUBLICATIONS

Jussi-Pekka Jansson, et al., "A CMOS Time-to-Digital Converter With Better Than 10 ps Single-Shot Precision," Jun. 2006, pp. 1286-1296.

Robert Togdan Staszewski, et al., "1.3 V 20 ps Time-to-Digital Converter for Frequency Synthesis in 90-nm CMOS," Mar. 2006, pp. 220-224.

Masayoshi Terabe, et al., "Timing Jitter Measurement in Single-Flux-Quantum Circuits Based on Time-to-Digital Converters With High Time-Resolution," Jun. 2007, pp. 552-555.

* cited by examiner

*Primary Examiner* — Thanh Le
(74) *Attorney, Agent, or Firm* — Trop, Pruner & Hu, P.C.

(57) ABSTRACT

In one embodiment, the present invention includes a method for digitizing a phase noise value indicative of a level of phase noise present in a LO signal and downconverting an RF signal to a second frequency signal using the LO signal. This downconversion can cause the phase noise to be transferred to the second frequency signal. The method may thus further include removing the phase noise from the second frequency signal using the digitized phase noise value.

22 Claims, 9 Drawing Sheets

CORRECTING FOR PHASE NOISE OF AN OSCILLATOR

BACKGROUND

In many receiver systems such as radio and television receivers, incoming signals are received at very high frequencies and are downconverted to lower frequencies for processing of message information within the received signals. Typically, incoming signals are received by an antenna or other capture device and various front end processing is performed to condition the signal. The signal is then typically downconverted in a mixer, which operates to mix the incoming signal, which is generally at a radio frequency (RF) level with a mixing signal at a local oscillator (LO) frequency.

Typically this LO frequency is generated in the receiver using a voltage control oscillator (VCO) or other such oscillator. Typically, the oscillator includes a phase lock loop (PLL) or other feedback loop to reduce or remove phase noise inherent in the generated LO frequency. However, such circuitry can be complex and can also consume significant area of a chip design, as well as consume significant power levels. However, without such a PLL or other phase correction mechanism in the local oscillator, the LO frequency introduces unwanted phase noise into the receiver.

SUMMARY OF THE INVENTION

According to one aspect, the present invention includes an apparatus having a phase-to-digital converter (PDC) to receive a local oscillator (LO) signal and determine a digital phase noise value corresponding to a measure of phase noise present in the LO signal, and a first mixer to receive an intermediate frequency (IF) signal obtained from a received radio frequency (RF) signal and remove phase noise from it using the digital phase noise value. A front end mixer is coupled to receive the RF signal and downconvert it to the IF signal using the LO signal, which causes the phase noise to be transferred to the IF signal. The LO signal can be generated in a local oscillator that does not include a phase lock loop, thus reducing LO size and complexity.

To remove the phase noise, a feed forward loop can be coupled between the front end mixer and the first mixer. The feed forward loop includes the PDC and a low pass filter to remove quantization noise generated by the PDC. In one implementation, the PDC includes a counter, a first storage coupled to the counter, a delay line coupled to receive the LO signal, a second storage coupled to receive L outputs from the delay line, and a decoder coupled to the second storage.

Another aspect of the present invention is directed to a method including digitizing a phase noise value indicative of a level of phase noise present in a LO signal and downconverting an RF signal to a second frequency signal using the LO signal. This downconversion can cause the phase noise to be transferred to the second frequency signal. The method may thus further include removing the phase noise from the second frequency signal using the digitized phase noise value.

Yet another aspect of the present invention is directed to an apparatus that includes a digitally controlled oscillator (DCO) to generate a LO signal, and a phase digitization means coupled to the DCO for receiving the LO signal and determining a phase noise present in it. Still further, the apparatus may have a receive chain including first and second mixers and a feed forward loop coupled between the mixers to remove the phase noise based on the determined phase noise from the phase digitization means.

A still further aspect of the present invention is directed to a system that includes a tuner to receive a RF signal from a signal source and downconvert the RF signal to a baseband frequency to extract a signal channel from the RF signal. The tuner includes a PDC in accordance with an embodiment of the present invention to receive a LO signal and determine a digital phase noise value corresponding to a measure of phase noise present in the LO signal. A downstream mixer then receives a downconverted signal and removes phase noise from it using the digital phase noise value. The system can further include a demodulator coupled to the tuner to demodulate the signal channel and generate a transport stream that can be further processed in a processor coupled to the demodulator, for example, to obtain audio visual data.

DETAILED DESCRIPTION

In various embodiments, a receiver can utilize a local oscillator (LO) that avoids the need for a phase lock loop (PLL). In this way, the need for various circuitry of the LO such as analog varactors, an analog loop filter, and a charge pump can be avoided. However, in so doing the generated LO signal may include high levels of phase noise. In different receivers, various requirements for phase noise may exist. For example, in digital video broadcasting (DVB), a phase noise margin of approximately −40 dBc is called for. Thus in designing a receiver for a DVB system, phase noise that is generated in developing an LO signal should be controlled to remain below this phase noise margin level.

In various embodiments, phase noise created by a LO, e.g., implemented as a voltage controlled oscillator (VCO) or other such oscillator, can be determined using phase digitization means. Then, responsive to the determined phase noise, a feed forward loop may be provided to enable cancellation of the phase noise at a later stage of a receive chain of a receiver, such as at a final downconversion stage, which may occur prior to demodulation of an incoming signal after analog front end (AFE) processing.

In various embodiments, different manners of digitizing the phase noise may be realized. In one such embodiment, a phase-to-digital converter (PDC) can be provided, which may be realized as a phase quantizer. However, the scope of the present invention is not limited in this regard and in other implementations, phase digitization means may take the form of a delay chain or a delay-locked loop, for example.

Furthermore, embodiments of PDCs can be used in different implementations. While described primarily herein in connection with canceling phase noise based on the determined noise value such as by canceling the phase noise in a feed-forward fashion during a final down-conversion in a receive chain prior to demodulation, the scope of the present invention is not limited in this regard. For example, in other implementations the phase noise may be determined and used in connection with phase demodulation such as in demodulation of frequency modulation (FM) signals or other such RF signals in which message information is encoded in the phase.

Figure 1:
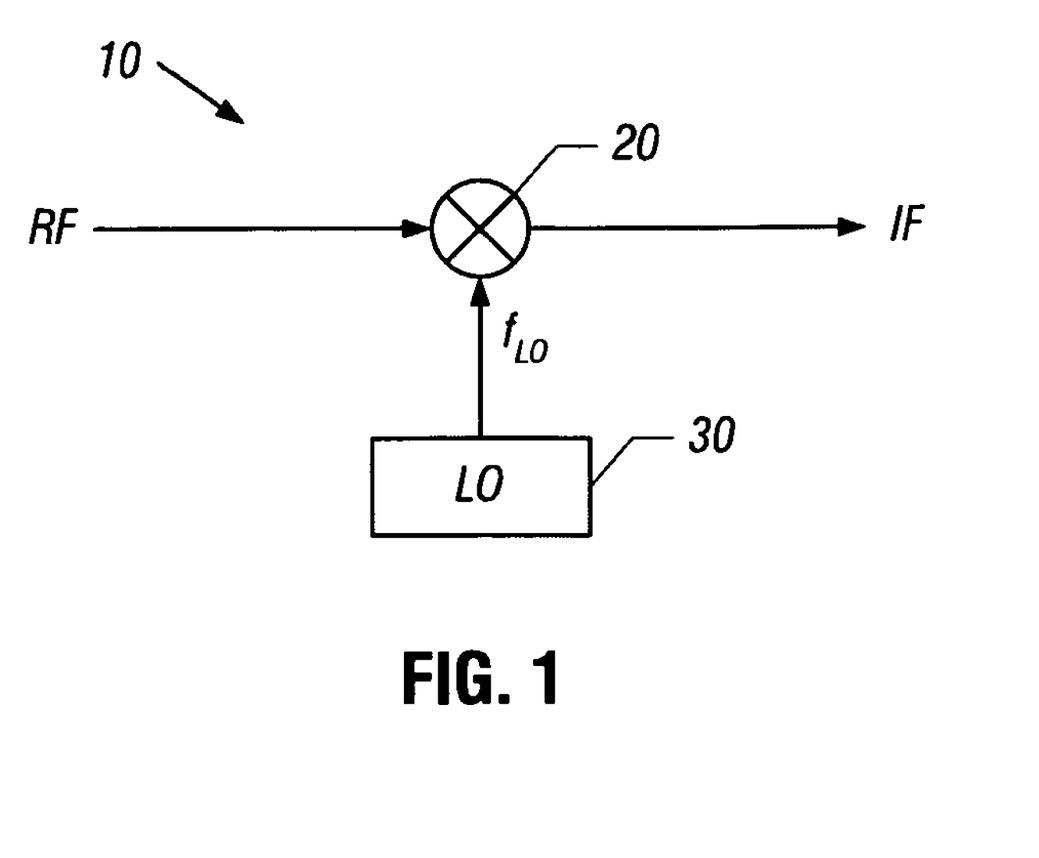
FIG. 1 is a block diagram of a portion of an analog front end of a receiver.

An RF front-end generally downconverts the RF signal to a lower intermediate frequency (IF) or to direct current (DC) level for further processing. Referring now to FIG. 1, shown is a block diagram of a portion of an analog front end of a receiver. As shown in FIG. 1, receiver 10 includes a mixer 20 that is coupled to receive an incoming RF signal, RF, that has a phase $\Phi_{RF}$ that includes message signal information encoded in a phase value $\Phi_m$. In turn, mixer 10 is further coupled to receive a local oscillator frequency $f_{LO}$ from a LO 30 which, in one embodiment may be a VCO, although the scope of the present invention is not limited in this regard. A phase value $\Phi_{LO}$ of the LO signal includes phase noise $\Phi_n$. Mixer 20 operates to downconvert the RF signal by an amount of the LO frequency to an IF signal. Accordingly, during the down-conversion, phase noise of the LO signal is transferred to the IF signal.

The RF signal equals: $V_{RF}=e^{j(w_{RF}t+\Phi m)}$. Similarly, the LO signal is: $V_{LO}=e^{j(w_{LO}t+\Phi n)}$. Accordingly, the resulting downconverted IF signal is as follows: $V_{IF}=e^{j(w_{IF}t+\Phi m)} \cdot e^{-j\Phi n}$.

Hence, if an accurate measurement of $\Phi_n$ can be obtained, the effect of phase noise can be cancelled by multiplying the IF signal by $e^{j\Phi n}$. That is, in various embodiments, the determined phase noise can be provided in a feed forward fashion to be mixed with the downconverted signal, e.g., at an IF level to enable canceling of the phase noise.

Figure 2:
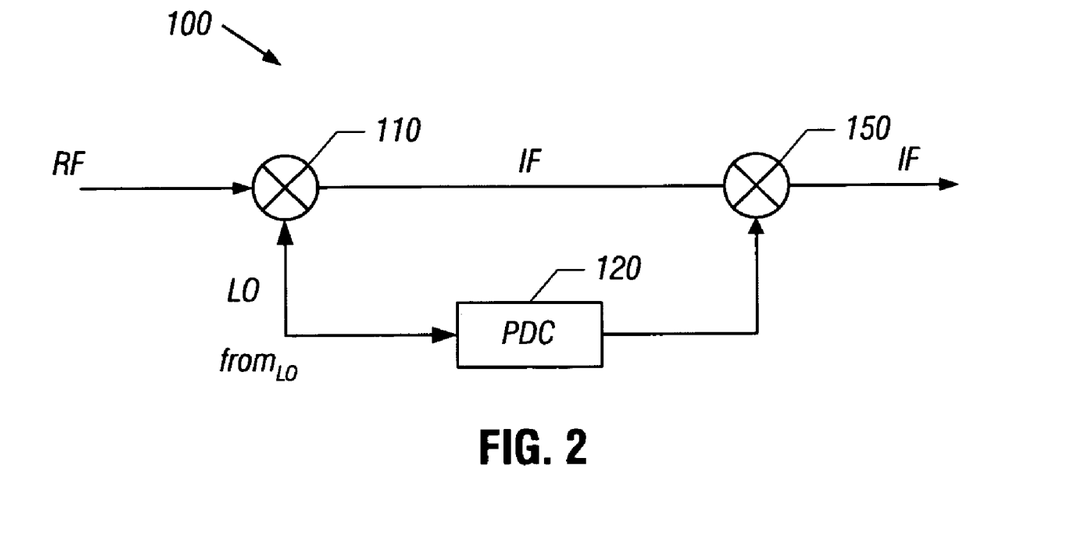
FIG. 2 is a high level view of a feed forward loop in accordance with one embodiment of the present invention.

Referring now to FIG. 2, shown is a high level view of a feed forward loop in accordance with one embodiment of the present invention. As shown in FIG. 2, feed forward loop 100 may be adapted between a front end mixer, e.g., a mixer that mixes incoming RF signals with an LO signal having an LO frequency, and a downstream mixer to enable phase noise inserted into the receive chain by the LO signal to be cancelled out at this downstream mixer. Thus as shown in FIG. 2, feed forward loop 100 includes a first mixer 110 and a second mixer 150. First mixer 110 is coupled to receive an incoming RF signal, e.g., from front end components such as an antenna, a low noise amplifier (LNA), other gain control stages or so forth. Furthermore, mixer 110 receives the LO signal. While the scope of the present invention is not limited in this regard, in an implementation for a direct video broadcast (DVB) system, the incoming RF signals may be at frequencies of between approximately 468.75 and 896.75 megahertz (MHz). The LO frequency may be at, for example, between 468.75 and 888.75 MHz to enable an IF signal out of mixer 110 at between approximately 0 and 8 MHz. However, this is for purposes of explanation only and the scope of the present invention is not limited in this regard. Instead, as discussed above the system can be used with many different receiver types, both operating using IF stages and those which directly down mix an incoming RF signal to baseband.

Referring still to FIG. 2, the LO signal is also provided to a PDC 120. While the scope of the present invention is not limited in this regard, in one embodiment PDC 120 may be a phase quantizer. PDC 120 operates to quantify the phase noise present in the LO signal, namely PDC 120 outputs a phase noise value $e^{j\hat{\Phi}n}$. Note that this phase noise determined in the simplified block diagram of FIG. 2 includes a quantization error, $e^{j\tilde{\Phi}n}$. Thus the output of PDC 120 includes both the actual phase noise plus a quantization error. As will be discussed further below, in some embodiments various filtering mechanisms or other means may be used to reduce or remove such quantization errors.

Referring still to FIG. 2, this phase noise can then be provided to second mixer 150, which receives the incoming IF signal and the phase noise and thus cancels the phase noise effect such that the phase output of mixer 150 corresponds to $e^{j(w_{IF}t+\Phi m)} \cdot e^{-j(\Phi n+\tilde{n})}$. Note that loop 100 shown in FIG. 2 is at a high level, and various additional components may be present in some embodiments. For example, mixer 150 may also receive another LO signal, i.e., of another oscillator to further mix with the IF signal to provide downconversion to baseband. Furthermore, because the signal input to second mixer 150 is at IF levels, the digitized phase noise value determined in PDC 120 may be converted to an analog value using an analog-to-digital converter (ADC), not shown for ease of illustration in FIG. 2. Alternately, the IF signal may be digitized to baseband prior to such mixing with the phase noise value.

Assuming a L-level phase quantizer, each quantization level is $$\Delta = \frac{2\pi}{L}$$

wide. From the well-known equation, the rms value of the quantization error is given as:

$$\epsilon_{rms} = \frac{\Delta}{\sqrt{12}} = \frac{2\pi}{\sqrt{12}L} = \frac{\pi}{\sqrt{3}L} \quad [\text{EQ. 1}]$$

For example if L=8, $\epsilon_{rms}$=0.227 radians, which equals 13 degrees.

Hence, while the PDC measures phase noise of the LO signal, it adds quantization noise, which can be unacceptably high. However, if the quantization noise is placed strategically on the frequency spectrum, i.e., by ensuring that the quantization noise power is concentrated at relatively high frequencies, then low frequency phase noise cancellation can be achieved while filtering out high-frequency quantization noise. This is acceptable because it can be sufficient to cancel only low-frequency phase noise in most systems.

Figure 3A:
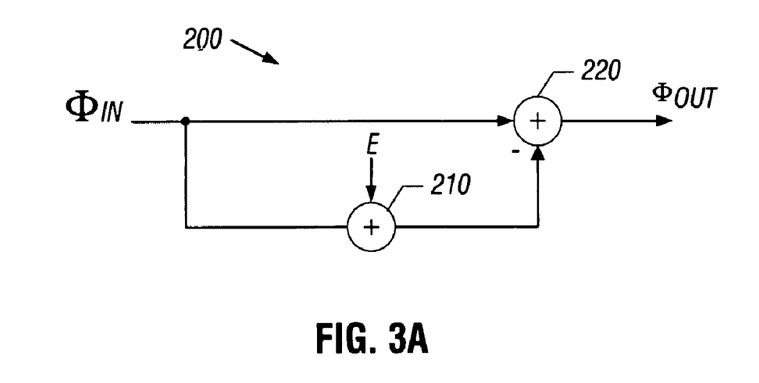
FIGS. 3A-3D are simplified block diagrams of phase noise cancellation in a wide band and a low frequency cancellation scheme in accordance with an embodiment of the present invention.
Figure 3B:
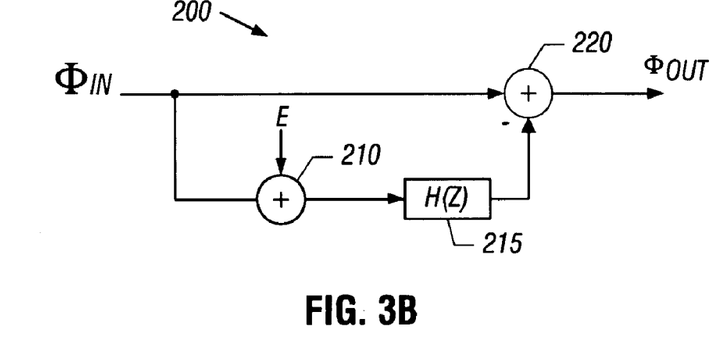

Referring now to FIGS. 3A and 3B, shown are simplified block diagrams of phase noise cancellation in a wide band and a low frequency cancellation scheme, respectively. As shown in FIG. 3A, system 200 provides incoming phase information, $\Phi_{in}$ to a first adder 210 and a second adder 220. In first adder 210, the incoming phase information is combined with phase quantization noise $\epsilon$. The output is subtracted out in combiner 220 such that phase out equals:

$$\Phi_{out}=\Phi_{in}-(\Phi_{in}+\epsilon)=-\epsilon \quad [\text{EQ. 2}]$$

Thus using this simplified system, wide band phase noise cancellation results in the presence of a quantization noise, $\epsilon$.

Referring now to FIG. 3B, which is a simplified view of a system to provide low frequency phase noise cancellation, in addition to combiners 210 and 220, a filter 215, which may be a low pass filter, is present. Thus the resulting signal, $\Phi_{out}$, is as follows:

$$\Phi_{out} = \Phi_{in} \cdot (1 - H(z)) + \epsilon \cdot H(z) \quad \text{[EQ. 3]}$$

Figure 3C:
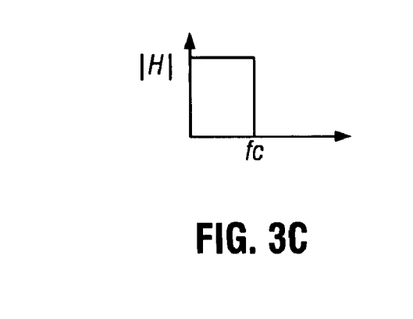
Figure 3D:
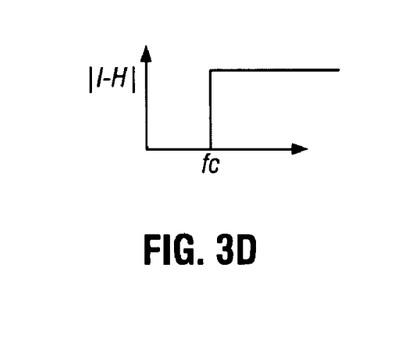

Thus if $H(z)$ is an ideal low-pass filter, then $[1-H(z)]$ become an ideal high-pass filter, shown respectively in FIGS. 3C and 3D. Hence, the output of the system is $\Phi_{in}$ shaped by an ideal high-pass filter $(1-H(z))$ plus the quantization noise shaped by the ideal low-pass filter $(H(z))$.

Figure 4A:
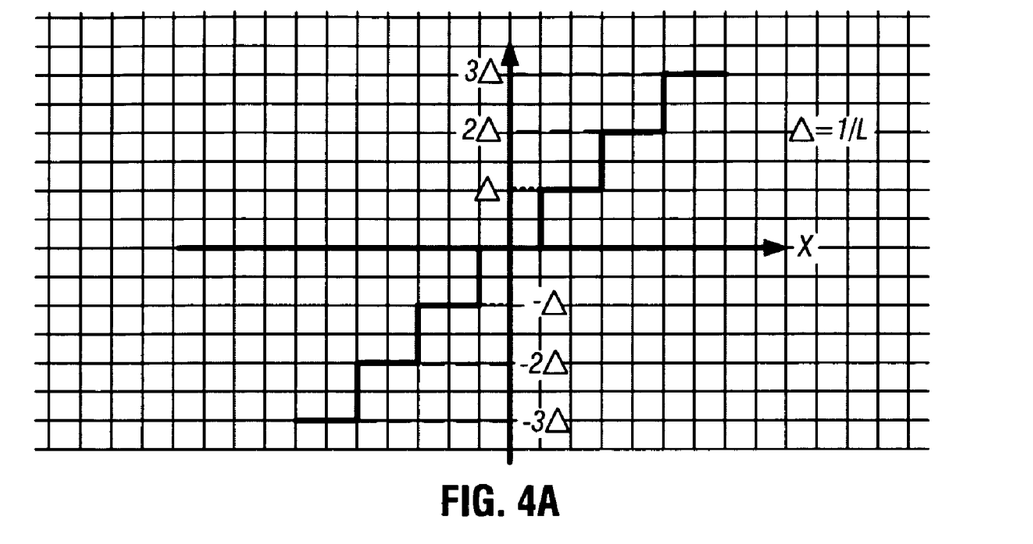
FIGS. 4A and 4B are diagrams of an L-level phase quantizer in accordance with one embodiment of the present invention.
Figure 4B:
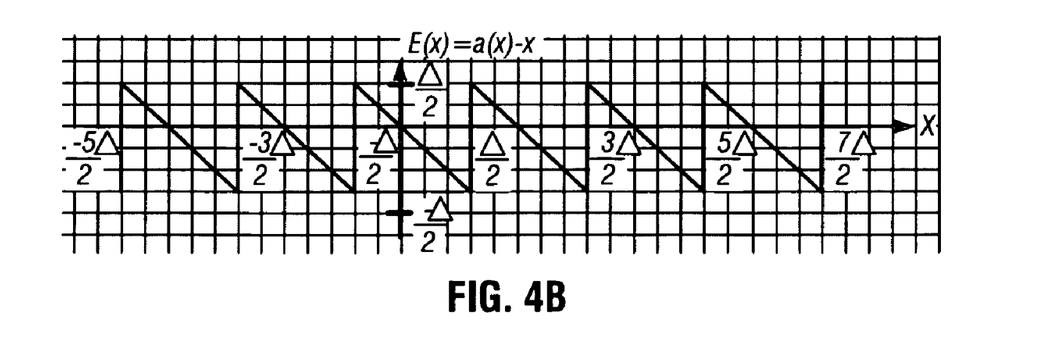

Consider an L-level phase quantizer, as shown in FIGS. 4A and 4B. $\epsilon(x)$ is a periodic function of x, which can be represented as a Fourier series as follows:

$$\epsilon(x) = \sum_{k=-\infty}^{\infty} ak \cdot e^{-j2\pi \frac{kx}{\Delta}} = \sum_{k=-\infty}^{\infty} ak \cdot e^{-j2\pi kLx} \quad \text{[EQ. 4]}$$

$$ak = \frac{1}{\Delta} \int_{-\Delta/2}^{\Delta/2} -xe^{-j2\pi \frac{k}{\Delta}x} dx = \begin{cases} \frac{\Delta}{2\pi jk}(-1)^k & k \neq 0 \\ 0 & k = 0 \end{cases} \quad \text{[EQ. 5]}$$

$$\epsilon(x) = \sum_{\substack{k=-\infty \\ k \neq 0}}^{\infty} \frac{\Delta}{2\pi jk}(-1)^k e^{j2\pi kLx} \quad \text{[EQ. 6]}$$

$$= \sum_{k=1}^{\infty} \frac{\Delta}{\pi k}(-1)^k \sin(2\pi kLx)$$

Therefore given x, one can represent $\epsilon(x)$ in the above fashion. An interesting case is when x has a component that is proportional to time, i.e., $x(t) = f_o t + u(t)$, where $f_o$ is a beat frequency (described below) and $u(t)$ is the phase noise to be measured. Then $$\epsilon(x) = \sum_{k=1}^{\infty} \frac{1}{\pi Lk}(-1)^k \sin(2\pi kLf_o t + 2\pi kLu(t)) \quad \text{[EQ. 7]}$$

The quantization noise is the sum of phase-modulation sinusoids of $k \cdot L \cdot f_o$, with $u(t)$ being the phase-modulating signal. By choosing $f_o$ sufficiently high, one can make sure that the quantization noise power will be mostly at relatively higher frequencies. However, as the phase-to-digital converter is a sampled system, content at frequencies above half the sampling frequency (fs/2) can potentially corrupt the low frequency content due to folding.

Analysis of beat frequencies that can corrupt low frequency content due to folding leads to determination of a proper beat frequency (and thus sampling frequency for the PDC). Beat frequency is defined as the remainder of a division operation between the LO frequency and a reference frequency, i.e., the sampling frequency of the PDC. More specifically, the beat frequency $f_o = f_{LO} - K \cdot f_{ref}$ where K is an integer $0 < f_0 < f_{ref}$. It can be shown that for beat frequencies that satisfy $$\frac{n}{k \cdot L} f_{ref} - \frac{f_{BW}}{kL} < f_o < \frac{n}{kL} f_{ref} + \frac{f_{BW}}{kL}$$

where $f_{ref}$ is the sampling frequency of the PDC, and $f_{bw}$ is the low frequency corner, the quantization noise folds down to band of $[0, f_{bw}]$, corrupting low-frequency phase noise measurement. Therefore, while choosing beat frequencies, this discrete frequency band should be avoided in order not to corrupt the low-frequency phase noise information. Remaining quantization noise outside the band of $[0, f_{BW}]$ can be removed by a subsequent low-pass filter, $H(z)$.

Figure 5:
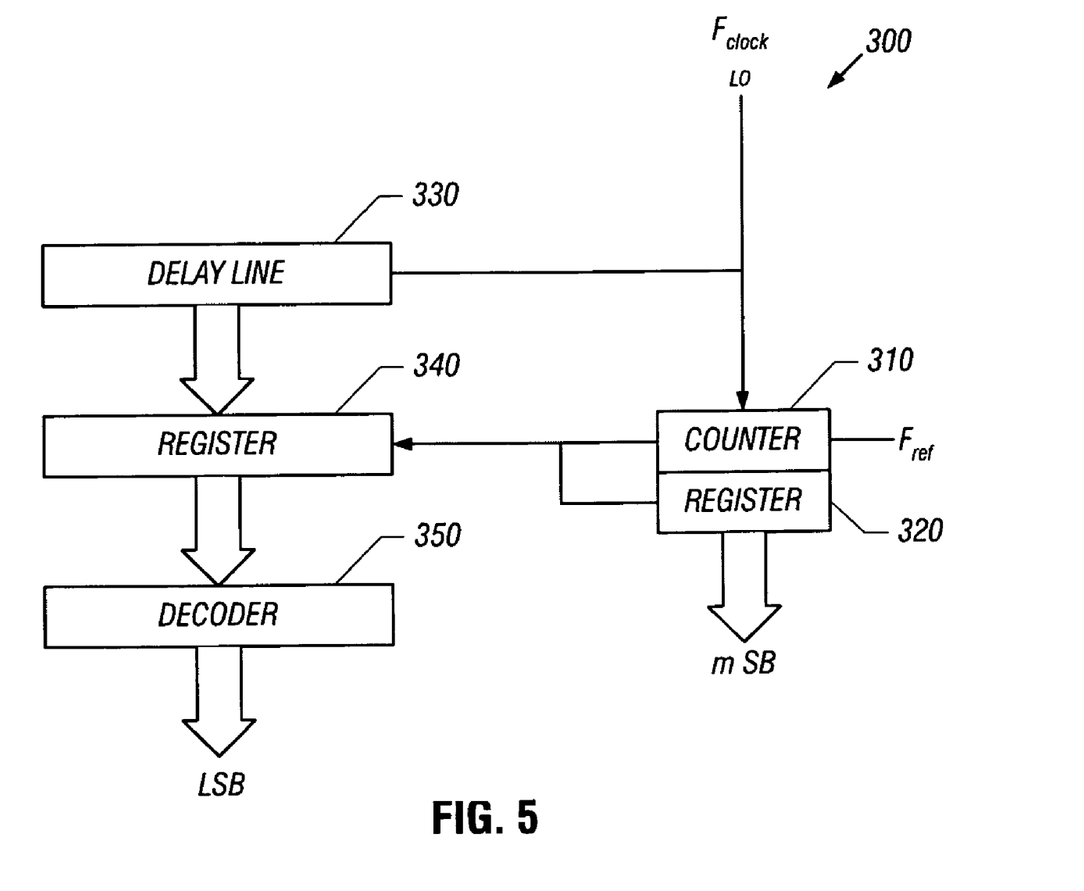
FIG. 5 is a block diagram of a phase-to-digital converter in accordance with an embodiment of the present invention.

Referring now to FIG. 5, shown is a block diagram of a phase-to-digital converter in accordance with one embodiment of the present invention. As shown in FIG. 5, PDC 300 may be implemented using various components that are configured to receive an incoming clock signal, i.e., $f_{LO}$, and a reference clock signal, i.e., a sampling clock for the PDC, namely $f_{ref}$ and based on the values generate a digital signal including a plurality of bits that provide a quantization of the phase noise of the LO frequency with respect to the reference frequency.

In the implementation of FIG. 5, the LO signal is provided to a counter 310 and a delay line 330. Counter 310 is clocked by the reference clock signal, $f_{ref}$. For each period of the reference clock signal, counter 310 may count a number of full cycles of the LO signal and store the information in a register 320. As will be described further below, this information may correspond to the most significant bits (MSBs) of the digital output. Similarly, delay line 330 is coupled to receive the LO signal and provide delayed versions of the LO signal (i.e., by a number of stages of the delay line) to a register 340, also controlled by the reference clock signal. When triggered by the full cycle of the reference clock frequency, the value of register 340, which corresponds to a value of the number of delay elements in delay line 330 at a first state at the time of the reference clock signal, is passed from register 340 to a decoder 350, which may include a lookup table or other logic to generate a M-bit output based on the L-bit input (i.e., corresponding to the L number of stages in delay line 330).

Thus the output of PDC 300 corresponds to a digital word having N+M bits, where the N MSB bits are an integer value corresponding to a full number of LO clocks occurring during the reference clock period, and the M least significant bits (LSBs) correspond to a fractional number of LO cycles during the reference clock period, expressed by the quantization level of PDC 300.

Suppose that $f_{LO} = K \cdot f_{ref} + f_o$, where K is an integer $0 < f_o < f_{ref}$ ($f_o$=beat frequency). The phase value $\Phi(t) = 2\pi f_{LO} t + \Phi_n(t)$, where $\Phi_n(t)$ is phase noise of the LO. Once the phase noise is sampled by $f_{ref}$:

$$\Phi_s(nTs) = 2\pi f_{Lo} nTs + \Phi_n(nTs) \left(T_S = \frac{1}{f_{ref}}\right) \quad \text{[EQ. 8]}$$

$$\Phi_s(nTs) = 2\pi \frac{f_{LO}}{f_{ref}} n + \Phi_n(nTs) \quad \text{[EQ. 9]}$$

$$= \underbrace{2\pi kn}_{integer} + \underbrace{2\pi f_o nTs + \Phi(nTs)}_{\Phi \, fraction}$$

In the above equation, $\Phi_{integer}$ is the portion of the phase value detected by counter 310, while $\Phi_{fraction}$ is the phase portion quantized by delay line 330. Therefore, a phase value of $\Phi_f = 2\pi f_o nTs + \Phi_n(nTs)$ is quantized using PDC 300 of FIG. 5.

Recalling the quantization noise analysis of Equation 7, $$\epsilon(\Phi_f) = \sum_{k=1}^{\infty} \frac{\Delta}{\pi k}(-1)^k \sin(2\pi kLf_o n + kL\Phi_n(n)). \quad \text{[EQ. 10]}$$

The above expression suggests that the quantization noise is a summation of sinusoids, modulated by the scaled phase noise of the LO signal. As k increases, the phase modulation index increases also, causing the quantization noise to spread out more. However, the total power of the $k^{th}$ term is reduced due to a 1/k dependence.

Thus ensuring that the first certain number of terms are outside the low-frequency band where phase-noise cancellation is desired, the effect of quantization noise can be minimized. The number of terms may depend on the quantization level L and total quantization noise that can be allowed after phase noise cancellation. Furthermore, careful selection of the beat frequency can provide for significantly reduced phase noise, as measured in the PDC after phase noise correction (i.e., low frequency phase noise correction) in accordance with an embodiment of the present invention. Note that this selection of beat frequency may essentially occur by careful selection of LO frequency, as in a given system implementation the reference clock is likely a fixed design value. For example, given that the LO signal may be in the GHz range, fine tuning of the LO signal in a fine band of approximately 200 kHz may enable selection of a beat frequency that enables reduced phase noise.

Figure 6:
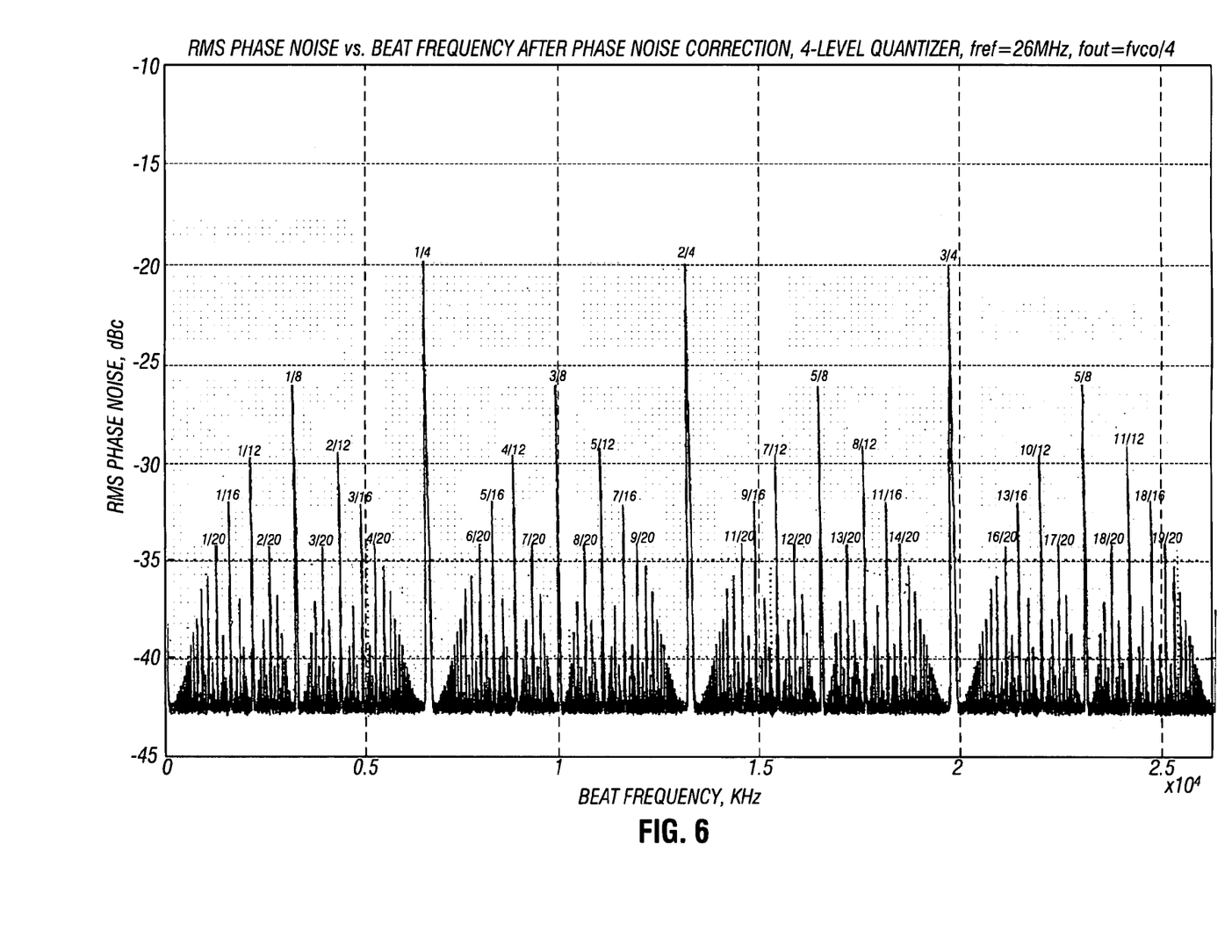
FIG. 6 is a graphical representation of phase noise versus beat frequency in accordance with one embodiment of the present invention.

Referring now to FIG. 6, shown is a graphical representation of phase plus quantization noise versus beat frequency. As shown in FIG. 6, for a four-level PDC having a sampling frequency (i.e., $f_{ref}$) of 26 MHz and an incoming LO frequency of approximately 6.5 GHz, beat frequencies between zero and 26 MHz can lead to varying levels of phase noise. For particular systems such as DVB systems having a requirement of approximately −40 dBc as a phase noise margin requirement, careful selection of a beat frequency can enable such relatively low levels of phase noise. For example, adjusting LO frequency by a small amount can move the beat frequency from a value of approximately 13.5 MHz (and a ½ dependence), causing phase noise of more than −20 dBc, to a value of approximately 13 MHz, causing phase noise of less than −40 dBc. However, the scope of the present invention is not limited in this regard, and different values of a beat frequency may be selected based on different reference and LO frequencies as desired for a given system implementation. Details of a particular implementation in a RF receiver are described further below, however the scope of the present invention is not limited in this regard.

Figure 7:
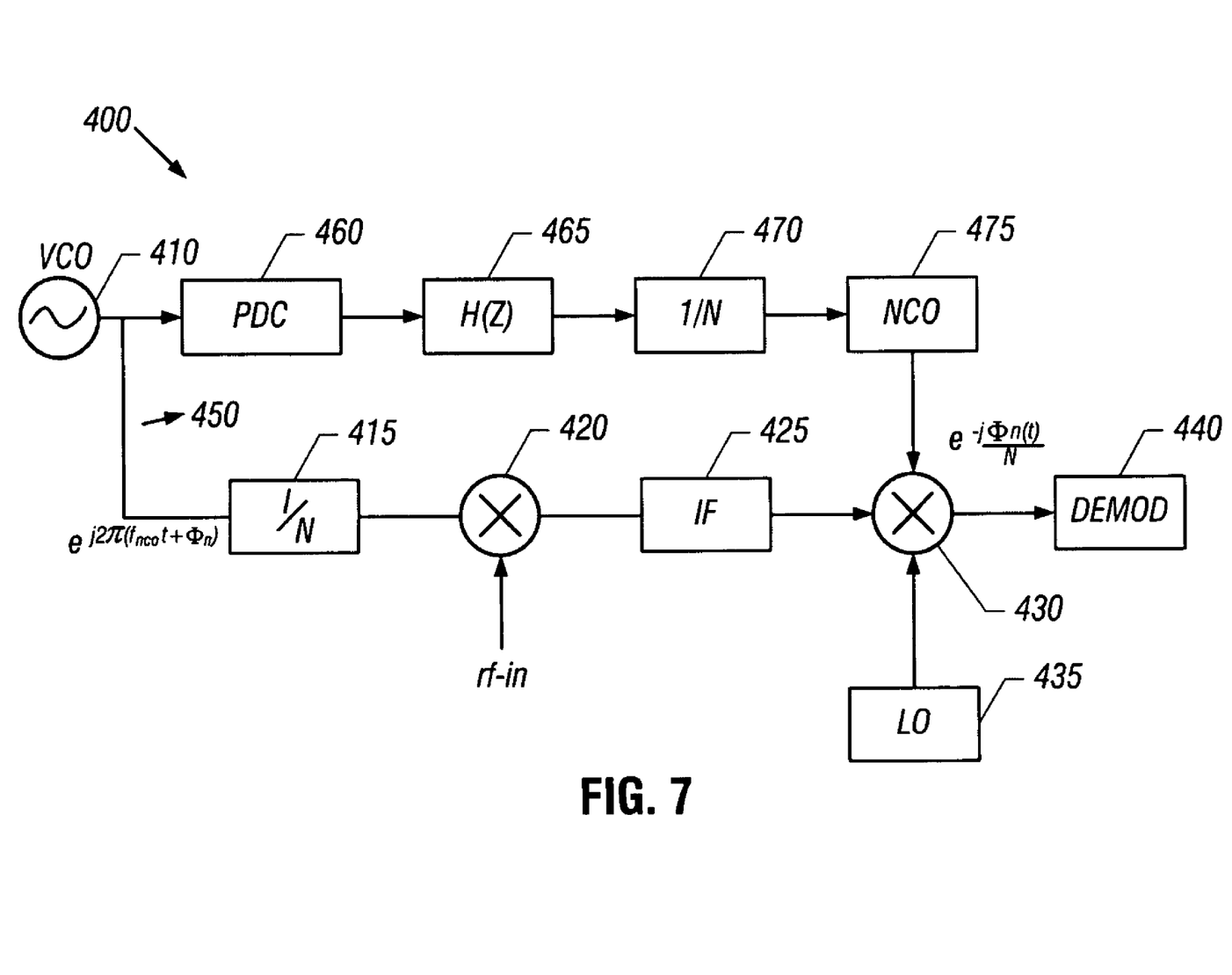
FIG. 7 is a block diagram of a portion of a receiver in accordance with one embodiment of the present invention.

Referring now to FIG. 7, shown is a block diagram of a portion of a receiver in accordance with one embodiment of the present invention. As one such example, receiver 400 may be a portion of a DVB receiver configured to receive and process incoming TV signals at ultra high frequency (UHF) bands or L-band signals.

The incoming RF signals may be provided to a mixer 420, after receipt, e.g., with an antenna and appropriate gaining such as with one or more low noise amplifiers (LNA) or other such gain stages. The incoming RF signals are mixed at mixer 420 with a signal derived from a local oscillator 410 which in one embodiment may be a VCO, although the scope of the present invention is not limited in this regard. Note that LO 410 may be a relatively simple oscillator that lacks a PLL or other phase correction circuitry. Instead, using a feed forward loop in accordance with an embodiment of the present invention, any phase noise generated within LO 410 can be removed or reduced to an acceptable level.

The LO frequency is provided to a frequency divider 415, which divides this LO frequency by a predetermined value, N, to provide a divided LO signal to mixer 420. Mixer 420 thus downconverts the incoming RF signal to an IF signal. Various IF processing may be performed in IF block 425, where various filtering, gain control and other such processing may be performed (optionally). Then the resulting IF signals are provided to a second mixer 430, which may receive a different LO signal (e.g., 8 MHz) from another oscillator, i.e., LO 435. Second mixer 430 acts to downconvert the IF signal to a baseband signal which is then provided to a demodulator 440 for demodulation according to a given scheme, e.g., an orthogonal frequency division multiplexing (OFDM) demodulation scheme, where the incoming signals are OFDM modulated.

In addition, second mixer 430 acts to remove phase noise from the IF signal. That is, as described above, generation of the LO frequency, particularly in the absence of a PLL within the LO can create a LO signal having phase noise. To reduce or remove such phase noise in accordance with an embodiment of the present invention, a feed forward loop 450 may be provided in receiver 400. As described above, feed forward loop 450 may enable a feed forward phase noise cancellation scheme that generates a phase noise cancellation value based on the measured phase noise of the LO signal and provides this phase noise cancellation value to second mixer 430 to enable removal of the phase noise from the IF signal.

As shown in FIG. 7, loop 450 includes a PDC 460 which, in one embodiment may take the form of that shown above in FIG. 5, although the scope of the present invention is not limited in this regard. Because PDC 460 may introduce some amount of quantization noise, a filter 465, which may be a digital filter, can be provided to remove the quantization noise, at least at low frequencies, i.e., filter 465 may be a low pass filter. The filtered quantized phase noise value may be provided to a divider 470 which corresponds to the same division value as divider 415. The divided value then may pass through a numerically controlled oscillator (NCO) 475 to thus generate a phase noise value to be provided to second mixer 430. Accordingly, the output of second mixer 430 may correspond to the IF signal, free from or having reduced phase noise. While shown with this particular implementation in the embodiment of FIG. 7, the scope of the present invention is not limited in this regard. For example, while shown in FIG. 7 as including an NCO 475, in other embodiments, a direct digital frequency synthesizer (DDFS) or other such digital synthesizer may be provided to enable generation of a phase noise correction value from the input to the synthesizer. Still further, the NCO or DDFS may generate both the phase noise value and the mixing signal, avoiding the need for second LO 435.

As example values, in one embodiment LO 410 may operate at 6.5 GHz with a given tuning range. Dividers 415 and 470 may divide by 4, 8, 10 or 12, as examples.

While not shown in FIG. 7, understand that because phase noise correction is occurring after IF processing, the amplitude and phase response of the IF chain from the mixer output (i.e., first mixer 420) to a digitizer output (i.e., within IF block 425) can affect the phase noise correction. As a result, in some embodiments an IF filter that has the inverse characteristic of IF block 425 may be inserted after this IF block and prior to second mixer 430. However, in implementations such as described above for a DVB receiver where a relatively wideband signal exists, both the amplitude and phase response of the IF chain should be quite smooth with negligible variation, and as such this filter may be avoided.

Thus embodiments may provide a feed forward phase noise cancellation scheme in a digital domain to improve low frequency phase noise operation of an oscillator. To prevent quantization noise of a PDC within this loop from corrupting a measured phase noise value, a free running frequency of the LO may be strategically determined based on an analysis of a beat frequency (i.e., with respect to a sampling frequency). Using such an analysis, discrete bands may be identified where the LO frequency can be set. In an embodiment using a sampling frequency of 26 MHz, such bands may be of approximately 200 kHz wide. Thus in such an embodiment, an oscillator can be a digitally controlled oscillator (DCO) having an operational capability of ten parts per million with respect to fine frequency control.

Figure 8:
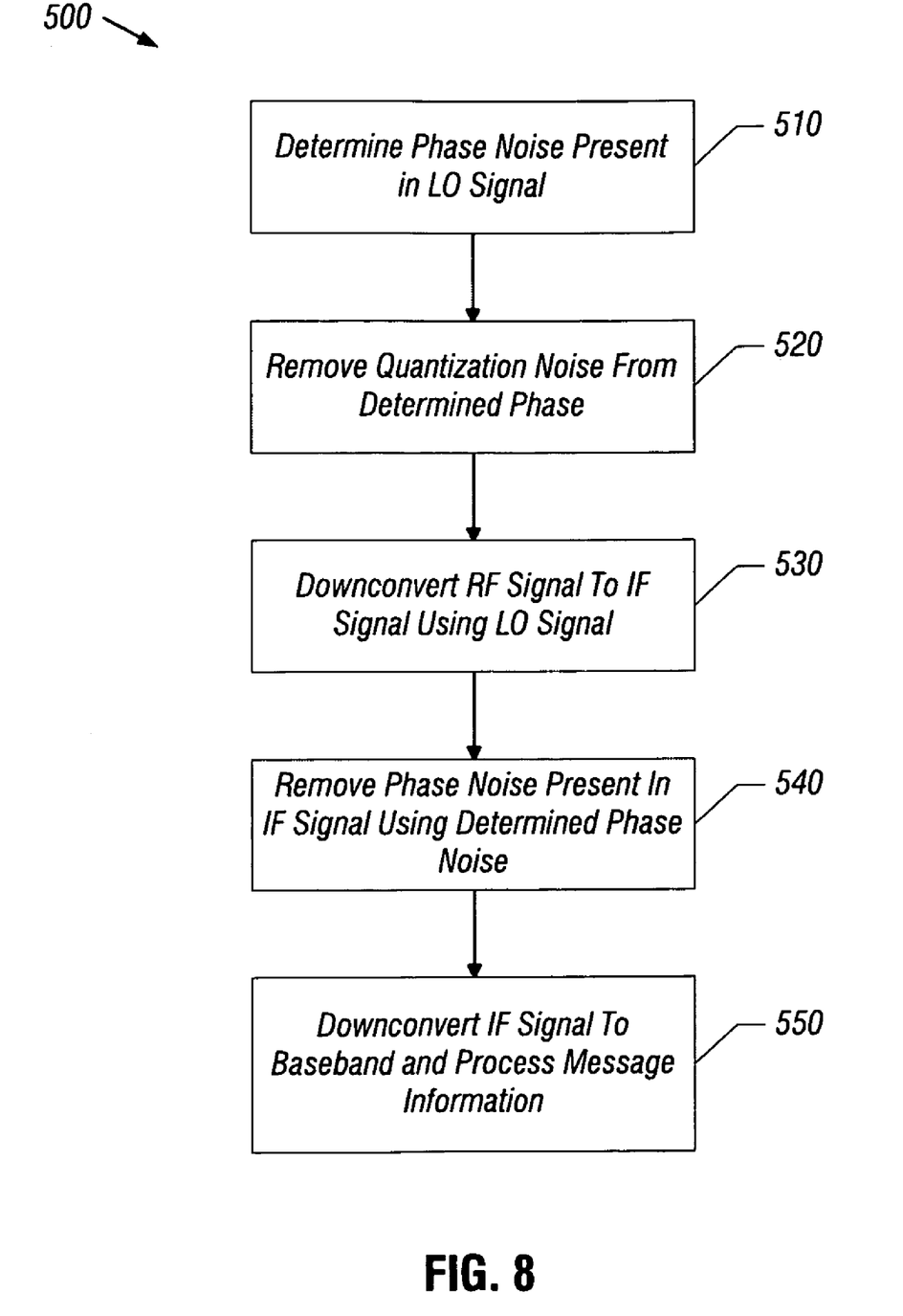
FIG. 8 is a flow diagram of a method to remove phase noise in accordance with an embodiment of the present invention.

Thus in various embodiments, phase noise present in an LO signal, which can be transferred to an incoming received signal when the LO signal is mixed with the received signal, can be removed downstream of the original mixing. An example method to remove phase noise is set forth in FIG. 8. As shown in FIG. 8, method 500 may begin by determining phase noise present in an LO signal (block 510). As an example, a PDC in accordance with an embodiment of the present invention may generate a digitized phase noise value, although the scope of the present invention is not limited in this regard. When in a digitized form, quantization noise may be present in the determined phase noise. Accordingly, at block 520 this quantization noise may be removed, for example, using one or more digital filters.

This determined phase noise may be used in connection with an incoming received signal, e.g., an incoming RF signal which may include desired signal information such as radio information, television information or so forth. This RF signal may be downconverted to an IF signal using the LO signal (block 530). For example, a front end mixer in an analog front end of a receiver may receive the RF signal and using the LO signal, downconvert it to an appropriate IF frequency. Then the phase noise determined to be present in the LO signal, which by the mixing is transferred to the IF signal, may be removed (block 540). In some implementations this operation may be performed at IF frequencies using a second mixer to mix the IF signal with a representation of the digitized phase noise. In connection with removing the phase noise, e.g., in the second mixer, the IF signal may be downconverted to baseband and the message information present may be processed, e.g., in a demodulator. While described with this particular implementation in the embodiment of FIG. 8, the scope of the present invention is not limited in this regard. In various embodiments, hardware, software, firmware, or combinations thereof may perform the method of FIG. 8. For example, the PDC, filter, and related feed forward loop circuitry may be realized in the digital domain such as in firmware or software executed by a general-purpose processor, digital signal processor (DSP) or other such processing circuitry.

Figure 9:
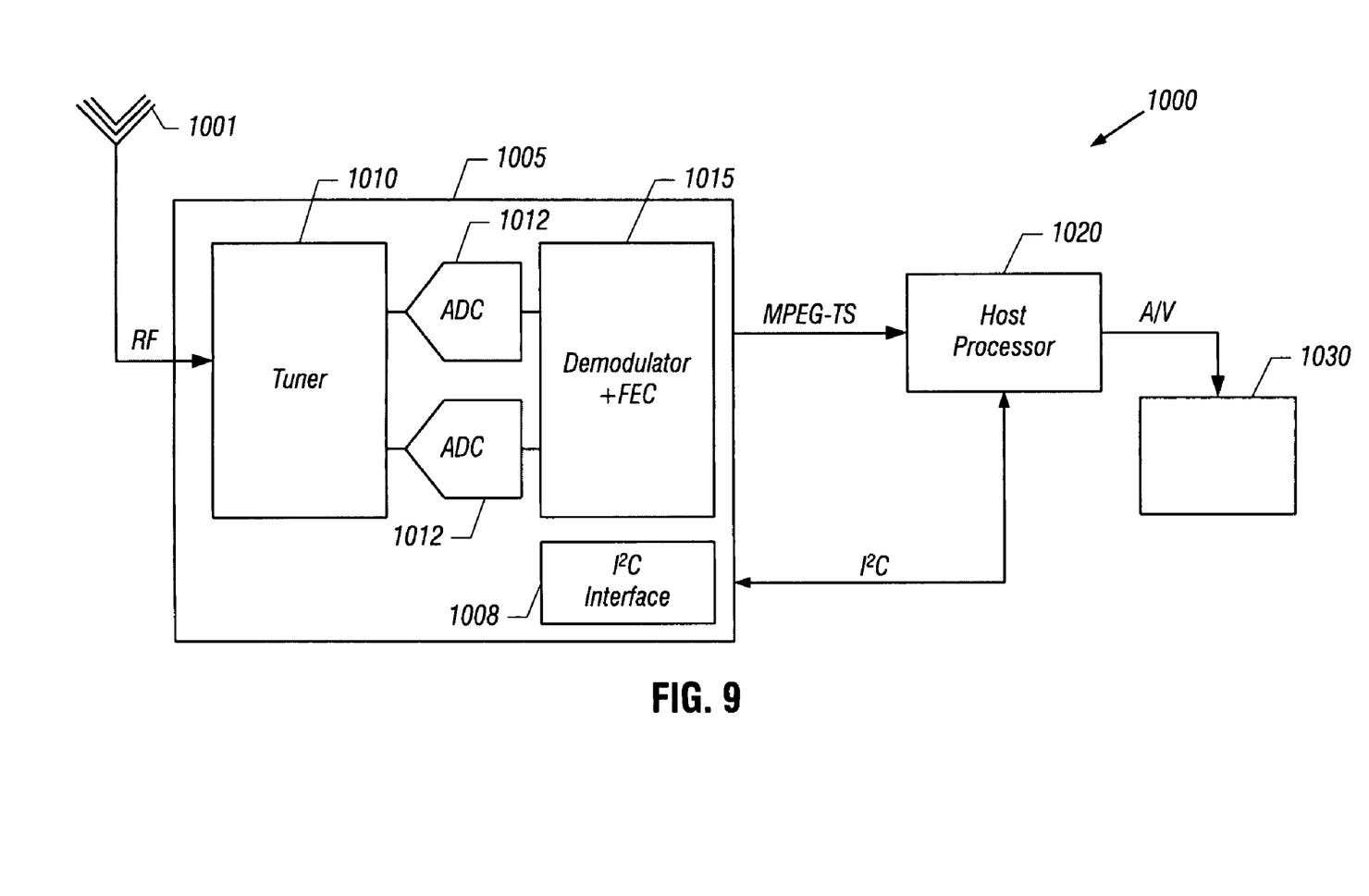
FIG. 9 is a block diagram of a system in accordance with one embodiment of the present invention.

Embodiments may be implemented in many different system types, such as set-top boxes, high definition or standard digital terrestrial televisions, and so forth. Some applications may be implemented in a mixed signal circuit that includes both analog and digital circuitry. Referring now to FIG. 9, shown is a block diagram of a system in accordance with one embodiment of the present invention. As shown in FIG. 9, system 1000 may include a television that is coupled to receive a RF signal from an antenna source 1001 such as an over-the-air antenna 1001. However, in other embodiments, the original source may be cable distribution, satellite, or other source that is then redistributed through a digital terrestrial network. The incoming RF signal may be provided to a front end device 1005 which may be, in one embodiment a single-chip mixed signal device. Front end device 1005 may incorporate embodiments of the present invention to determine and remove phase noise generated by an LO.

Referring still to FIG. 9, front end device 1005 may include a tuner 1010 and a demodulator 1015 that may include FEC circuitry. More specifically, the incoming RF signal is provided to a tuner 1010 for tuning to a desired signal channel. While the scope of the present invention is not limited in this regard, tuner 1010 may include various circuitry. For example, in one embodiment tuner 1010 may include a bandpass filter having an output coupled to a low noise amplifier (LNA) to receive and amplify the RF signal. The output of the LNA may be provided to another bandpass filter that in turn is coupled to a first mixer. In turn, the first mixer downconverts the incoming RF signal to a complex IF output. The IF signal may be further processed and then provided to a second mixer with an IF LO signal, along with a phase noise value representation based on the LO signal's phase noise, as determined in a digitization means, such as a PDC. Thus in the second mixer the phase noise can be removed from the IF signal, which is then converted to baseband and digitized by analog-to-digital converters (ADCs) 1012, to provide a desired signal channel.

Referring still to FIG. 9, the digitized output of ADCs 1012 may be provided to additional processing circuitry including demodulator 1015 which may be the demodulator and FEC circuitry shown in FIG. 1. The output of demodulator 1015 may correspond to a transport stream such as an MPEG-TS that is provided to a host processor 1020 for further processing into an audio visual signal that may be provided to a display 1030, such as a computer monitor, flat panel display or other such display. Note further, a control channel which may be in accordance with an I²C communication path may be present between host processor 1020 and front end device 1005. Accordingly, front end device 1005 may include an I²C interface 1008 to enable communication along this path.

While shown with this particular implementation in the embodiment of FIG. 9, it is to be understood the scope of the present invention is not limited in this regard. Furthermore, it is to be understood that embodiments may be implemented in many different devices, such as receivers, transmitters and so forth. Still further, control logic, program storage or other computer readable media may be present to store instructions that when executed within tuner 1010 enabled determination and removal of phase noise.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus comprising:
 a phase-to-digital converter (PDC) to receive a local oscillator (LO) signal and to determine a digital phase noise value corresponding to a measure of phase noise present in the LO signal, the PDC comprising:
  a counter to receive the LO signal, the counter controlled by a reference clock, wherein the counter is to generate a count of LO signal cycles during a cycle of the reference clock;
  a first storage coupled to the counter to store the count;
  a delay line coupled to receive the LO signal, the delay line having L stages each to provide an output;
  a second storage coupled to receive the L outputs and to provide a value of the L outputs responsive to the reference clock;
  a decoder coupled to the second storage to receive the values and generate a decoder output corresponding to a number of partial LO cycles during the reference clock cycle; and a first mixer to receive an intermediate frequency (IF) signal obtained from a received radio frequency (RF) signal and remove phase noise from the IF signal using the digital phase noise value.

2. The apparatus of claim 1, further comprising a second mixer to receive the RF signal and downconvert the RF signal to the IF signal using the LO signal, wherein the phase noise is transferred to the IF signal within the second mixer.

3. The apparatus of claim 2, further comprising a local oscillator to generate the LO signal, wherein the local oscillator does not include a phase lock loop.

4. The apparatus of claim 3, further comprising a feed forward loop coupled between the second mixer and the first mixer, the feed forward loop including the PDC.

5. The apparatus of claim 4, wherein the feed forward loop further comprises a low pass filter coupled to an output of the PDC to remove quantization noise generated by the PDC.

6. The apparatus of claim 1, wherein the PDC is to output a digital word including N+M bits, wherein the N bits correspond to the count and the M bits correspond to the decoder output.

7. The apparatus of claim 6, wherein the N bits are the most significant bits of the digital word and the M bits are the least significant bits of the digital word.

8. The apparatus of claim 1, wherein a beat frequency ($f_o$) of the PDC corresponds to a difference between a frequency of the LO signal and a product of the reference clock and a predetermined integer value less than the beat frequency, such that the PDC does not corrupt low frequency content.

9. A method comprising:
digitizing a phase noise value indicative of a level of phase noise present in a local oscillator (LO) signal, including generating a count of LO signal cycles during a cycle of a reference clock, storing the count, receiving the LO signal in a delay line, the delay line having L stages each to provide an output, providing a value of the L outputs responsive to the reference clock, and generating from the value an output corresponding to a number of partial LO cycles during the reference clock cycle;
downconverting an incoming radio frequency (RF) signal to a second frequency signal using the LO signal, wherein the downconverting causes the phase noise to be transferred to the second frequency signal; and
removing the phase noise from the second frequency signal using the digitized phase noise value.

10. The method of claim 9, further comprising downconverting the second frequency signal to a baseband signal and demodulating the baseband signal to extract message information from the baseband signal.

11. The method of claim 10, further comprising removing quantization noise from the digitized phase noise value.

12. The method of claim 11, further comprising downconverting the RF signal to the second frequency signal in a first mixer and removing the phase noise from the second frequency signal and downconverting the second frequency signal to the baseband signal in a second mixer.

13. The method of claim 12, further comprising converting the digitized phase noise value to an analog value and providing the analog value to the second mixer for mixing with the second frequency signal.

14. The method of claim 9, further comprising digitizing the phase noise value in a phase-to-digital converter (PDC) having a beat frequency corresponding to a difference between a frequency of the LO signal and a product of the reference clock and a predetermined integer value less than the beat frequency, such that the PDC does not corrupt low frequency content.

15. An apparatus comprising:
a digitally controlled oscillator (DCO) to generate a local oscillator (LO) signal;
phase digitization means coupled to the DCO for receiving a LO signal and determining a phase noise present in the LO signal, wherein the phase digitization means comprises a counter to receive the LO signal, the counter controlled by a reference clock and to generate a first portion of a digital word corresponding to a count of LO signal cycles during a cycle of the reference clock, a delay line coupled to receive the LO signal, the delay line having L stages each to provide an output, and a decoder coupled to the delay line to receive the L outputs responsive to the reference clock and generate a second portion of the digital word corresponding to a number of partial LO cycles during the reference clock cycle;
a front end mixer to receive a radio frequency (RF) signal and downconvert the RF signal to an intermediate frequency (IF) using the LO signal, wherein the phase noise is transferred to the IF signal; and
a downstream mixer coupled to the front end mixer to receive the IF signal, a second LO signal and the determined phase noise and to downconvert the IF signal including the phase noise to a baseband signal without the phase noise.

16. The apparatus of claim 15, further comprising a feed forward loop coupled between the front end mixer and the downstream mixer, the feed forward loop including the phase digitization means.

17. The apparatus of claim 16, wherein the feed forward loop further comprises a low pass filter coupled to an output of the phase digitization means to remove quantization noise generated by the phase digitization means.

18. The apparatus of claim 15, wherein a beat frequency ($f_o$) of the phase digitization means corresponds to a difference between a frequency of the LO signal and a product of the reference clock and a predetermined integer value less than the beat frequency, such that the phase digitization means does not corrupt low frequency content.

19. A system comprising:
a tuner to receive a radio frequency (RF) signal from a signal source and downconvert the RF signal to a baseband frequency to extract a signal channel from the RF signal, the tuner including a phase-to-digital converter (PDC) to receive a local oscillator (LO) signal used in the downconversion and to determine a digital phase noise value corresponding to a measure of phase noise present in the LO signal, and a downstream mixer to receive a first downconverted signal and remove phase noise therefrom using the digital phase noise value, wherein the PDC comprises a counter to receive the LO signal, the counter controlled by a reference clock, wherein the counter is to generate a count of LO signal cycles during a cycle of the reference clock, a first storage coupled to the counter to store the count, a delay line coupled to receive the LO signal, the delay line having L stages each to provide an output, a second storage coupled to receive the L outputs and to provide a value of the L outputs responsive to the reference clock, and a decoder coupled to the second storage to receive the values and generate a decoder output corresponding to a number of partial LO cycles during the reference clock cycle;

a demodulator coupled to the tuner to demodulate the signal channel and to generate a transport stream therefrom; and a processor coupled to the demodulator to receive the transport stream and to process the transport stream to obtain audio visual data.

20. The system of claim 19, further comprising a feed forward loop coupled between an upstream mixer that receives the RF signal and the downstream mixer, the feed forward loop including the PDC.

21. The system of claim 20, wherein the feed forward loop further comprises a low pass filter coupled to an output of the PDC to remove quantization noise generated by the PDC.

22. The system of claim 19, wherein the digital phase noise value is provided to the demodulator for use in demodulation of the signal channel.

* * * * *